Patented July 6, 1954

2,683,125

UNITED STATES PATENT OFFICE 2,683,125

ION-EXCHANGE USING A VINYL ETHER CONTAINING QUATERNARY AMMONIUM HYDROXIDE GROUPS

Gaetano F. D'Alelio, Pittsburgh, Pa., assignor to Koppers Company, Inc., a corporation of Delaware No Drawing. Application December 5, 1951, Serial No. 260,083

21 Claims. (Cl. 260—2.1)

This invention relates to new anion-exchange resins. More particularly it relates to the preparation of anion-exchange resins having quaternary ammonium hydroxide groups.

Ion-exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Anion-exchange resins used for some of these purposes are disclosed in applicant's U. S. Patent 2,366,008, assigned to the General Electric Company, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehyde resins, and the phenol-formaldehyde-diethylene-triamine and triethylene-tetraamine resins, etc. However, the efficiency of these resins is not sufficiently satisfactory for many anion-exchange purposes.

Resins which are very efficient in anion-exchange have now been found which comprise water-insoluble, infusible resins containing quaternary ammonium hydroxide groups, the resins comprising polymers have a plurality of units of the formula

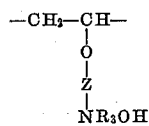

wherein Z is an alkylene group of 2 to 8 carbon atoms; and R is an alkyl group, an aralkyl group, or a quaternary ammonium hydroxide derivative of an alkyl amine or a polyalkylene polyamine group. These quaternary ammonium hydroxide resins can be prepared from polymers of vinyl chloroalkyl ethers by replacement of the chlorine with quaternary ammonium groups by reaction with tertiary amines and treatment of the resultant quaternary ammonium salt with alkaline materials such as sodium hydroxide, etc.

Vinyl chloroalkyl ethers which can be polymerized to give polymers suitable for the practice of this invention include vinyl alpha-chloroethyl ether, vinyl beta-chloroethyl ether, 1-vinyloxy-3-chloropropane, 1-vinyloxy-2-chloropropane, 1-vinyloxy-3-chlorobutane, 1-vinyloxy-5-chloropentane, etc., including mixtures of these. Although vinyl ethers having alkylene groups of more than 8 carbon atoms may be used, the presence of alkylene groups having more than 8 carbon atoms introduces a bulk factor which has no particular advantage for the purpose of this invention, and it is generally preferred to use vinyl chloroalkyl ethers in which the alkylene group has 2–8 carbon atoms. Tertiary amines which can be used for replacement of the chlorine by quaternary ammonium groups are trialkyl and triaralkyl amines, such as trimethyl amine, triethyl amine, tripropyl amine, tribenzyl amine, triphenethyl amine, tetramethyl ethylenediamine, tetraethyl ethylenediamine, pentamethyl diethylene triamine, etc., and mixtures of these as well as mixed tertiary amines such as dimethyl ethyl amine, dimethyl benzylamine, etc.

These resins may be regarded as polymers of vinyloxyalkyl trialkyl or triaralkyl ammonium hydroxides which can be prepared by the polymerization of vinyl chloroalkyl ethers, advantageously cross-linked either by copolymerization with a hydrocarbon type cross-linking agent as described hereinafter or cross-linked subsequent to the polymerization by means of polyamines, and the conversion of the polymerized vinyl chloroalkyl ethers to quaternary ammonium derivatives by reaction with tertiary amines, such as trialkyl amines and triaralkyl amines. The resultant quaternary ammonium salts are reacted with an alkaline material, such as sodium hydroxide or potassium carbonate to form the quaternary ammonium hydroxide derivatives which are very strong anion-adsorbing agents.

The amination is advantageously effected by adding the tertiary amine or amines to the vinyl chloroalkyl ether polymer while the polymer is suspended and agitated in a liquid suspension medium which also serves as a solvent for the amine. The reaction may be conducted at room temperature or advantageously at elevated temperatures.

The anion-exchange resins of this invention can also be prepared by other methods. For example, polymers of vinyl cyanoalkyl ethers can be reduced and exhaustively alkylated to quaternary ammonium derivatives in a manner similar to that disclosed in applicant's copending patent application, Serial No. 260,081, filed the same date herewith.

Cross-linking agents which are not necessarily equivalent but which are suitable for the purpose of this invention include various classes of hydrocarbon nucleus, with or without non-hydrocarbon substituents attached thereto, such as divinyl aryls, e. g., divinyl benzenes, divinyl naphthalenes, divinyl toluenes, divinyl xylenes, divinyl chlorobenzenes, divinyl diphenyls, etc. or other hydrocarbon-type cross-linking agents, such as butadiene, isoprene, cyclopentadiene, isopropenyl styrenes, diisopropenyl benzenes, vinyl cyclohexene, 1-phenyl-butadiene, 2-phenyl-butadiene, etc. Any substituents attached to the hydrocarbon nucleus of these cross-linking agents should be such as will not interfere with any of the steps of preparation or use of the anion-exchange resins. In some cases a cross-linking monomer may be used which has therein chlorine which is replaceable by tertiary amine groups, i. e., for example, chloroprene. When these hydrocarbon-type cross-linking agents are used, it is generally advantageous to use about 2–25 per cent by weight of the cross-linking agent, although even smaller quantities may be sometimes satisfactory.

In other cases, it is even possible to have the cross-linking effected by an alkylene or aralkylene group connecting two polymer chains by attachment to a nitrogen in each chain. Generally, this type of cross-linking may not be preferred since some of the quaternary ammonium hydroxide groups are thereby restricted in their movements and are not so easily accessible for anion-exchange activity. The latter type of cross-linking may be accomplished simultaneous with or subsequent to replacement of the chloro group by the quaternary ammonium group by reaction with tertiary amines of poly-functional nature, such as tetramethyl ethylenediamine, pentamethyl diethylenetriamine, etc. The cross-linking in such cases will have a structure similar to that indicated in the following diagram:

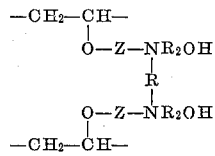

In other cases cross-linking might be accomplished by the replacement of an alkyl or aryl group on the tertiary amine by the bond of a Z group in another linear polymer chain to give a structure similar to that denoted in the following diagram:

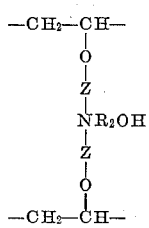

The vinyl chloroalkyl ethers can be polymerized by any of the well known methods, e. g., by suspension, emulsion, mass or solution polymerization. In many cases, the polymerization is advantageously conducted in a suspension or emulsion system since the polymer product is thereby obtained in a powder or granular form which is very convenient for subsequent anion-exchange purposes after the chloro groups have been replaced by quaternary ammonium hydroxide groups. The polymerization can be catalyzed by means of various per-compounds, such as ammonium persulfate, sodium persulfate, sodium perchlorate, peroxides, e. g., benzoyl, hydrogen, acetyl, acetylbenzoyl, phthalyl, lauroyl peroxides, t-butyl-hydroperoxide, etc.

Minor portions of certain other monomers, such as isobutylene, styrene, etc., may be used with the aforementioned monomers. However, these latter monomers should not have functional groups which will interfere with the polymerization activities of the monomers or with the ion-exchange activity of the products, or which may be ruptured to give substantial decrease in length of monomer chains or in cross-linking. Moreover, any cross-linking agent which is used should not contain such interfering functional groups. Since the quaternary ammonium hydroxide groups are the active ion-removing groups in these products, it is advantageous that the major portion of the original polymer product be of polymer units containing chloro groups which may be converted to the quaternary ammonium hydroxide groups.

The following examples illustrate more particularly the above-described methods for preparing ion-exchange resins.

*Example I*

To a mixture of 90 parts vinyl beta-chloroethyl ether and 10 parts divinyl benzene are added 10 parts chloroform solution containing 2 grams of iodine per 100 cc. The mixture is allowed to stand at room temperature for 6 days. The material is then subjected to reduced pressure, first at room temperature and then at 200–250° C. for several hours. The residue is comminuted and again subjected to reduced pressure first at room temperature and then at 200–250° C. for several hours. There is obtained an insoluble, cross-linked resin. This resin is suspended in excess trimethylamine and the mixture maintained at reflux temperature to effect quaternization of the chloroalkyl groups. There is obtained the quaternary ammonium chloride form of the resin which is converted to the quaternary ammonium hydroxide form by treatment with approximately ⅓ normal sodium hydroxide solution.

*Example II*

One hundred parts by weight of the resin of Example I is wet with 50 parts by weight of distilled water, and then 100 parts by weight of a standardized hydrochloric acid solution is added with shaking. After the resin and the solution have been in contact for about 15 minutes, the solution is separated from the resin by filtration. The filtrate solution is then titrated with sodium hydroxide to determine the amount of hydrochloric acid still in solution. If the filtrate solution has been completely neutralized by the resin, the procedure is repeated using a larger amount of the hydrochloric acid solution with a fresh sample of the resin. The efficiency of the resin is determined by calculating the ratio of chloride ions actually removed from the solution to the chloride ions theoretically removable. A good efficiency is indicated by these calculations.

*Example III*

The exhausted resin of Example II is regenerated by treatment with about ⅓ normal sodium hydroxide solution. After the solution is removed by filtration the resin is washed well with distilled water and retested for its anion-adsorption capacity according to the above-mentioned procedure. The efficiency after regeneration approximates the original capacity of the resin.

Example IV

To 100 parts of vinyl beta-chloroethyl ether are added 10 cc. chloroform solution containing 2 grams of iodine per 100 cc. The mixture is allowed to stand at room temperature for 6 days. The mixture is then subjeced to reduced pressure, first at room temperature and then at 200–250° C. for several hours. There is obtained approximately 30 per cent polymer.

The polymer is comminuted, admixed with 3 parts tetramethyl ethylenediamine, and heated to effect cross-linking of a portion of the chloroalkyl groups. The reaction product is admixed with excess trimethylamine and the mixture maintained at reflux temperature to effect quaternization of the remaining chloroalkyl groups. There is obtained the quaternary ammonium chloride form of the resin which is converted to the quaternary ammonium hydroxide form by treatment with approximately ⅓ normal sodium hydroxide solution.

This resin is tested by the procedures outlined in Examples II and III and efficiency of slightly less than that of the resin described in Example I is indicated.

Example V

Example I is repeated substituting for the divinyl benzene there used an equal quantity of butadiene-1,3 and conducting the reaction in a closed vessel. Substantially similar results are obtained.

The quaternary ammonium hydroxide resins of this invention are very efficient anion-adsorption agents due apparently to the highly basic character of the quaternary ammonium hydroxide groups. Other anions which may be removed from solution by the water-insoluble polymers of this invention, in addition to the chloride anions previously mentioned, include nitrate ions, sulfate ions, acetate ions, oxalate ions, tartrate ions, or any other anions which will react with the basic quaternary ammonium hydroxide groups in the resin to form insoluble salts. Very likely because of the highly basic character of the quaternary ammonium hydroxide groups, these resins are more efficient than the previously used amine-type anion-exchange resins. These anion-exchange resins can be readily regenerated by washing with a dilute alkali solution, preferably of an alkali-metal hydroxide which forms soluble salts with the adsorbed anions.

Inert material, such as diatomaceous earth, alundum, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

The invention as hereinbefore set forth is embodied in particular form and manner but may be variously embodied within the scope of the claims hereinafter made.

I claim:

1. A water-insoluble resin comprising a polymer having a plurality of repeating units having the structure

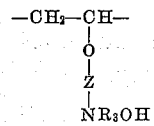

wherein Z is a member of the class consisting of alkylene groups of 2 to 8 carbon atoms; and R is a member of the class consisting of alkyl groups and aralkyl groups, and quaternary ammonium hydroxide derivatives of aminoalkyl and polyalkylene polyamino groups.

2. A water-insoluble resin of claim 1, in which the polymer molecule contains a major portion of said repeating units and at least 2 per cent by weight of a compound of the class consisting of hydrocarbon and $NR_3OH$-substituted hydrocarbon cross-linking agents.

3. A water-insoluble resin comprising a polymer of a vinyloxyalkyl trialkyl ammonium hydroxide in which the alkylene group of the vinyloxyalkyl group contains no less than 2 and no more than 8 carbon atoms.

4. A water-insoluble resin comprising a polymer of a vinyloxyalkyl triaralkyl ammonium hydroxide in which the alkylene group of the vinyloxyalkyl group contains no less than 2 and no more than 8 carbon atoms.

5. A water-insoluble resin comprising a polymer of beta-vinyloxyethyl trialkyl ammonium hydroxide.

6. A water-insoluble resin comprising a polymer of beta-vinyloxyethyl trimethyl ammonium hydroxide.

7. A water-insoluble resin comprising a polymer of beta-vinyloxyethyl triethyl ammonium hydroxide.

8. A process for preparing water-insoluble resins comprising the steps of reacting a polymer of a vinyloxy chloroalkane in which the alkane group contains at least 2 and less than 9 carbon atoms with a tertiary amine under aminating conditions therefor, and converting the resultant ammonium salt groups by reaction with an alkali metal hydroxide to quaternary ammonium hydroxide groups, the hydrocarbon portions of said tertiary amines belonging to the class consisting of aliphatic and aryl-aliphatic groups.

9. A process for preparing water-insoluble resin comprising the steps of polymerizing a vinyloxy chloroalkane in which the alkane group contains at least 2 and less than 9 carbon atoms, reacting the resultant polymer with a tertiary amine under aminating conditions therefor, and converting the resultant quaternary ammonium salt groups by reaction with an alkali metal hydroxide to quaternary ammonium hydroxide groups, the hydrocarbon portions of said tertiary amines belonging to the class consisting of aliphatic and aryl-aliphatic groups.

10. A process of claim 9, in which the vinyloxy chloroalkane is vinyl beta-chloroethyl ether.

11. A process of claim 10, in which the tertiary amine is trimethyl amine.

12. A process of claim 10, in which the tertiary amine is triethyl amine.

13. A process of claim 10, in which the tertiary amine is tribenzyl amine.

14. A process of claim 10, in which the polymerized vinyloxy chloroalkane contains in the polymer molecule a major portion of said vinyloxy chloroalkane and at least 2 per cent by weight of a compound of the class consisting of hydrocarbon and chlorine-substituted hydrocarbon cross-linking agents.

15. A process of claim 14, in which the cross-linking agent is butadiene-1,3.

16. A process of claim 9, in which the polymerized vinyloxy chloroalkane contains in the polymer molecule a major portion of said vinyloxy chloroalkane and at least 2 per cent by weight of a compound of the class consisting of hydrocarbon and chlorine-substituted hydrocarbon cross-linking agents.

17. A process of claim 16, in which the cross-linking agent is butadiene-1,3.

18. The method of treating liquid media to remove anions therefrom which comprises contacting said media with a water-insoluble resin comprising a polymer having a plurality of repeating units having the structure

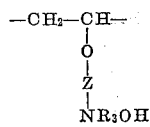

wherein Z is a member of the class consisting of alkylene groups of 2 to 8 carbon atoms; and R is a member of the class consisting of alkyl groups and aralkyl groups, and quaternary ammonium hydroxide derivatives of aminoalkyl and polyalkylene polyamino groups.

19. The method of claim 18, in which the polymer contains in the polymer molecule a major portion of said repeating units and at least 2 per cent by weight of a compound of the class consisting of hydrocarbon and $NR_3OH$-substituted hydrocarbon cross-linking agents.

20. The method of claim 18, in which Z is ethylene and each R is methyl.

21. The method of claim 18, in which Z is ethylene and each R is ethyl.

References Cited in the file of this patent

UNITED STATES PATENTS

| Number | Name | Date |
|---|---|---|
| 2,601,251 | Bruson | June 4, 1952 |